Inventor
Corliss D. Nugent
by Parker & Carter
Attorneys

Oct. 7, 1958
C. D. NUGENT
2,855,105
REPLACEABLE FILTER ELEMENTS
Filed March 15, 1955
4 Sheets-Sheet 4
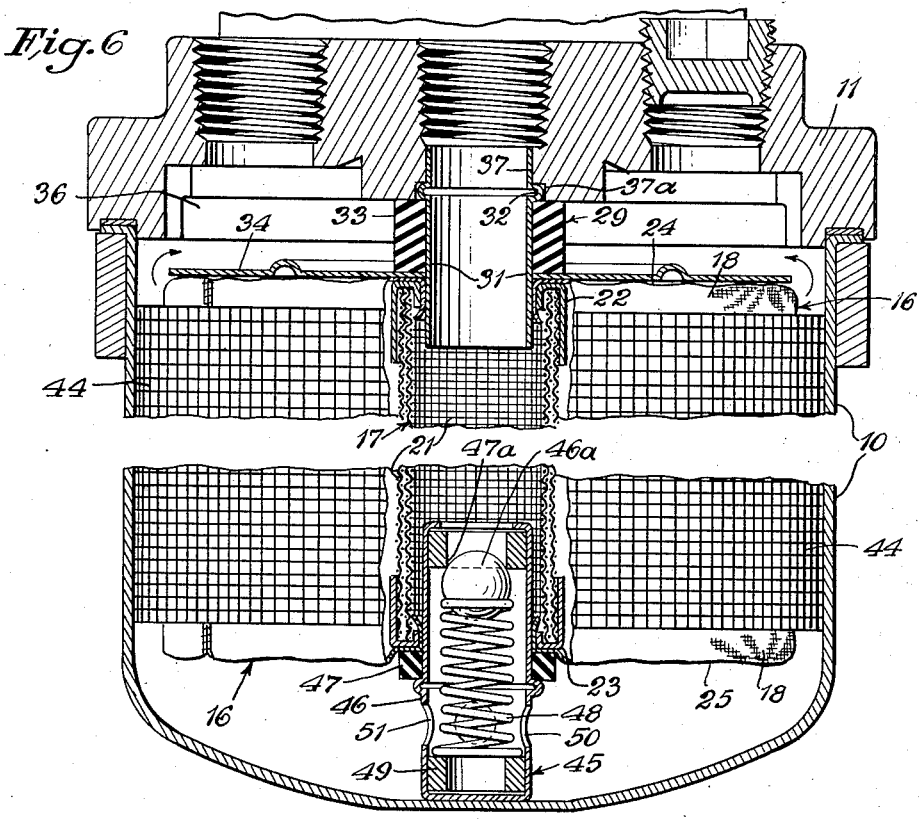
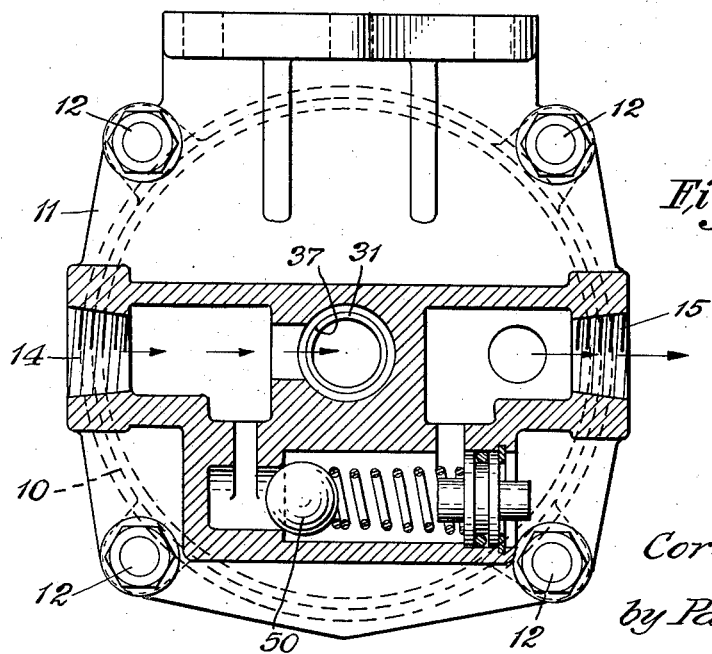
Inventor
Corliss D. Nugent
by Parker & Carter
Attorneys 've # 2,855,105

REPLACEABLE FILTER ELEMENTS

Corliss D. Nugent, Winnetka, Ill.

Application March 15, 1955, Serial No. 494,306

6 Claims. (Cl. 210—457)

This invention relates to improvements in replaceable filter elements for pressure filters of the kind having a casing and a replaceable filter element through which the oil or other liquid is forced from an inlet, thence through the filter element, and thence out through an outlet opening in the casing.

More particularly, my invention relates to a filter element of the so-called bag type, including an elongated filtering bag or envelope which is provided with a fluid inlet or outlet tube or core, extending therethrough, with the bag spirally wound on said core into a generally cylindrical shape to fit within a cylindrical casing.

The principal object of the present invention is to provide an especially simple and inexpensive construction for filter units of the bag type.

A further object is to provide an improved and simplified means for mounting the bag element on a central fluid conduit, and sealing the ends of said conduit to the edge or edges of the bag, so as to avoid leakage or by-passing of the fluid during the filtering operation.

Other objects and advantages of the invention will appear from time to time as the following description proceeds.

The invention may best be understood by reference to the accompanying drawings, in which:

Figure 5 is a transverse section taken through the head of the filter.

Figure 6 is a vertical section with parts broken away showing a modified form of filter and filter element.

Figure 1:
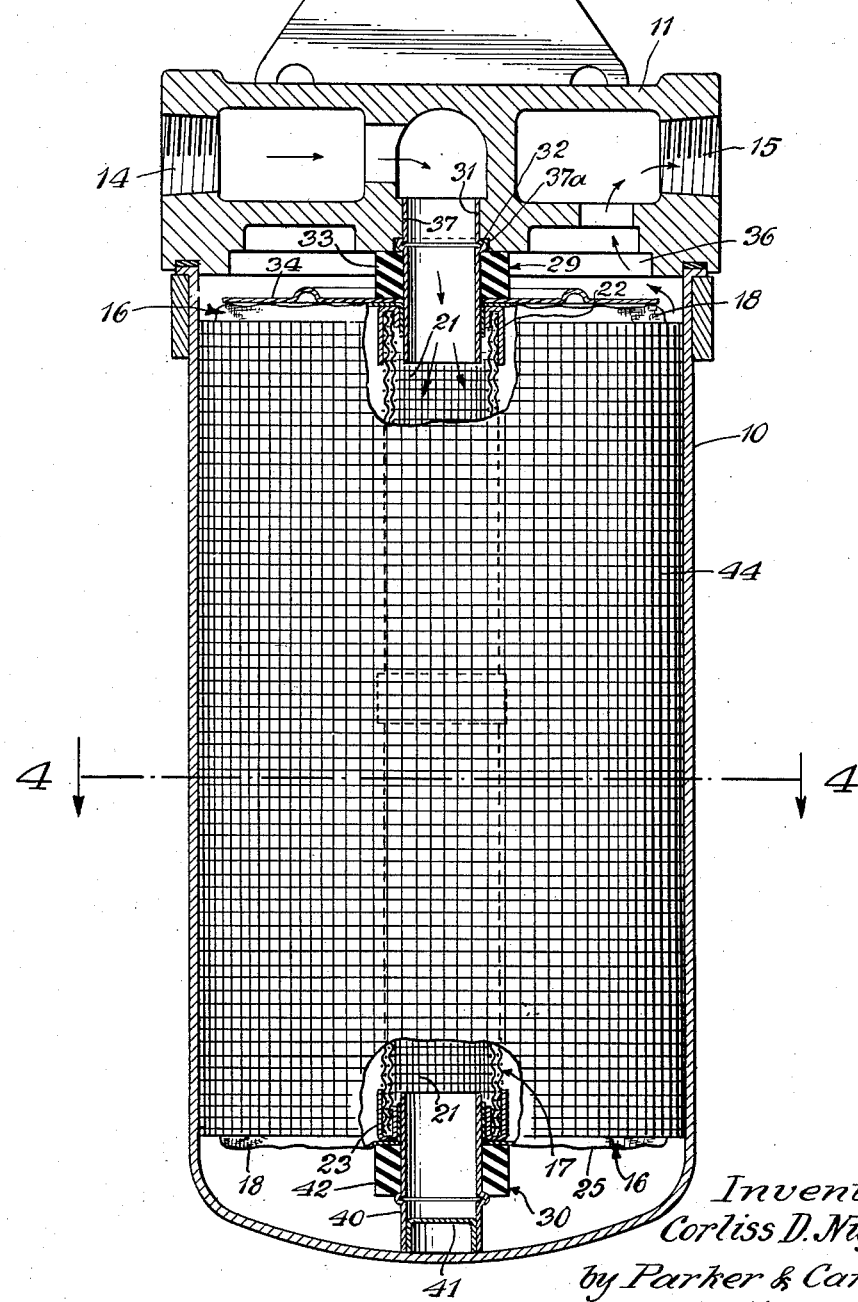
Figure 1 is a view in vertical section of a filter constructed in accordance with my invention.

Figure 1 shows a filter casing comprising a cylindrical shell 10, having a removable cover 11 secured thereto by any well known means as by bolts 12 (see Figure 5). The cover 11 has a centrally disposed threaded inlet port 14 and also a threaded outlet port 15 to one side of the inlet port.

A detachable filter unit or cartridge indicated generally at 16 is mounted in the shell 10. Said cartridge consists essentially of a perforated tubular core 17, a filtering element 18 of the bag type wrapped spirally around said core, and end seals indicated at 29 and 30 at the upper and lower ends of the core 17.

Figure 2:
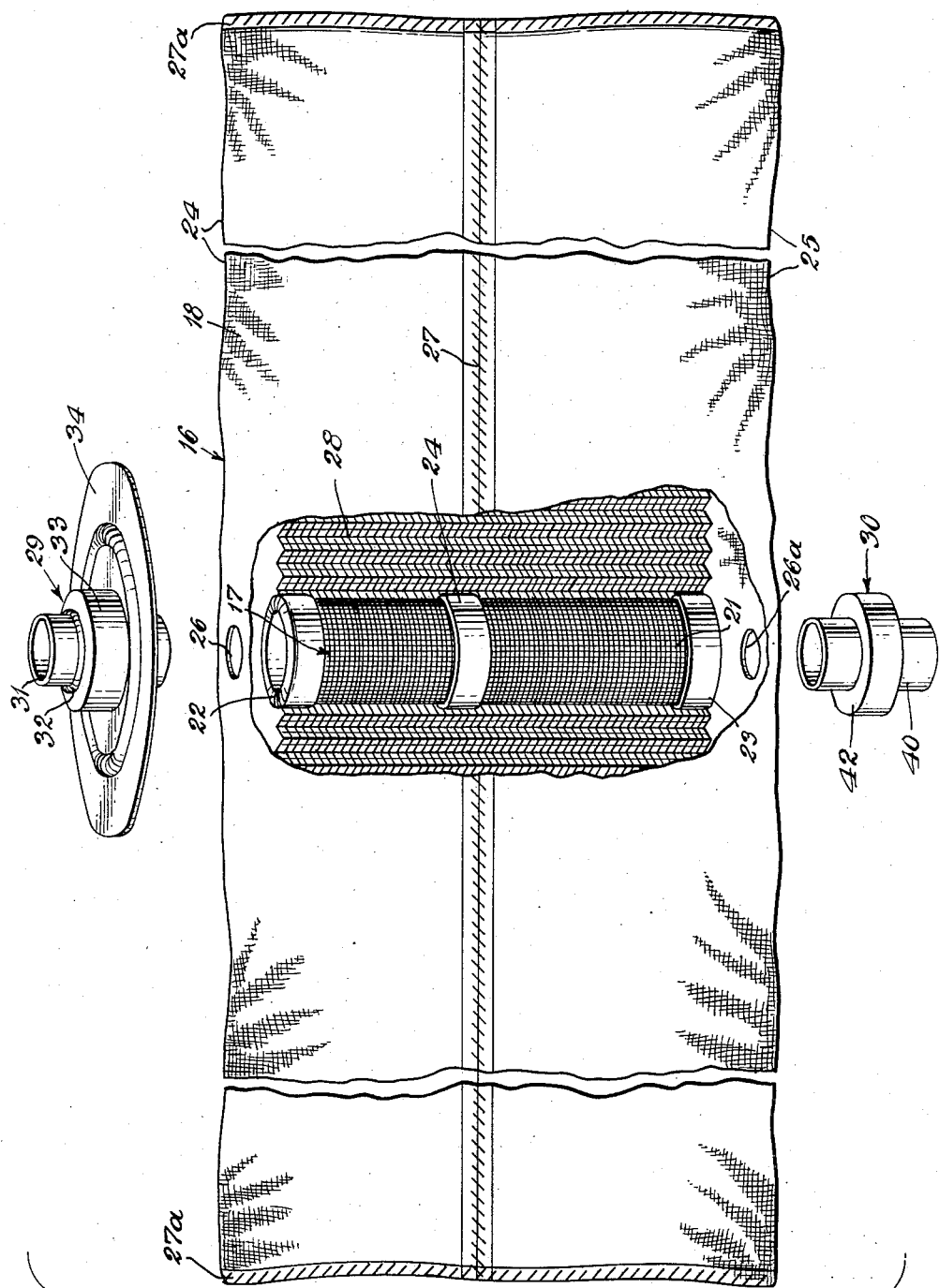
Figure 2 is a detail view of the bag type filter element with parts broken away and shown in flattened form before insertion in the filter casing of Figure 1 and with the end seals of the filter element removed, as before assembly.

The core 17 shown in Figure 2 consists of a perforated tube herein taking the form of a strong wire mesh screen 21, which is held in cylindrical form by flanged bushings 22 and 23 mounted on the upper and lower ends thereof. Where the tube is relatively long, one or more metal rings 24 may surround the tube at suitable places intermediate its ends, to hold the wire screen in cylindrical shape.

The filter bag 18 shown in detail in Figure 2 is made of a flexible textile or other sheet material suitable for filtering the liquid for which the device is intended. Cotton and wool fabrics of the proper texture are very efficient for oils, gasoline, water, etc., but these materials are mentioned as illustrative, and other sheets materials can also be used for the filter bag as desired.

The bag 18 is initially formed as an elongated generally rectangular, flattened member, which has seamless longer side edges 24, 25 which form the upper and lower edges of the bag when it is applied to the core 17. The seamless upper and lower edges have circular apertures 26 and 26a cut therethrough in opposed relation midway the ends of the bag, for attachment to the opposite ends of the core 17, as will presently be described. In other respects, the flattened bag member may be formed in any suitable manner, as by folding a single piece of sheet material into elongated tubular form, securing the longer edges of the sheet together along a longitudinal seam 27 intermediate the seamless upper and lower edges 24 and 25, and closing the opposite ends of the bag by seams 27a, 27a.

Before the bag 18 is fully closed by the seams sewn as above described, a corrugated wire screen 28 may be inserted within the bag for substantially the full length and width thereof to provide a separating mat therein. In the form shown herein, the inner separating screen or mat 28 consists of a single length of wire screen passing to one side of the core 17. It will be understood, however, that said mat can be formed of two shorter lengths, with their inner ends terminating adjacent the core 17, if desired. Moreover, the inner separating screen can be omitted, if desired, especially in cases where the flow of liquid is only to be produced from the inside to the outside of the bag.

The tubular hollow core 17 is also inserted in the bag, with the opposite ends of said core in registering relation with the apertures 26 and 26a at the opposite edges of the bag.

The opposite ends of the core 17 have the edges of the bag secured and sealed thereto in registering relation with apertures 26 and 26a, respectively, by the upper sealing member 29 and the lower sealing member 30. In the form shown, the upper sealing member 29 consists of a short sleeve 31, having a beaded intermediate portion 32 forming a stop for the upper end of an annular sealing ring 33 preferably consisting of a generally cylindrical piece of semi-elastic corrosion-resistant plastic material such as neoprene. A disc or plate 34 is fitted over the lower end of the sleeve 31 in close-fitting engagement with the lower face of the sealing ring 33.

When the sleeve 31 is applied to the end of the core 17, it will be understood that its lower end portion projecting beyond the plate 34 is passed through the adjacent circular aperture 26 of the bag. This aperture is made of slightly less diameter than that of the tube so as to fit tightly about the latter. Since the area of the bag surrounding said aperture is seamless, as previously described, it will be manifest that when the sleeve is fully inserted in the end of the core 17, the seamless rim of the bag portion 26 can be firmly engaged in a single thickness, and without wrinkles, between the upper face of the flanged bushing 22 on the adjacent end of the core 17 and the lower face of the plate 34 so as to secure the bag in firmly sealed relation to the core, as shown in Figure 1.

It will be observed further that when the sleeve 31, sealing ring 33, and plate 34 are in assembled relation, as shown in Figure 1, the plate 34 is in position to retain the adjacent upper edges of the filter bag against excessive upward extension when the bag is under fluid pressure, but has its periphery spaced inwardly of the casing 10 and below the cover 11, so as to permit the fluid to pass around its outer edges into a recessed portion 36 on the underface of the cover 11 for final passage to the outlet port 15 in said cover.

The upper surface of the sealing ring 33 is adapted to seat in fluid-tight engagement against the under face of the recessed portion 36 of cover 11, and the portion of the sleeve 31 which projects above said sealing ring 33 is adapted to have a sliding fit in a bore 37 formed centrally of the cover in communication with the inlet port 14 of the latter. In the form shown herein, the beaded portion 32 on the tube 31 is seated in a recess 37a at the lower end of the bore 37.

The lower sealing member indicated generally at 30 may be similar in construction to the upper sealing member 29 just described, except that no plate corresponding to plate 34 of the upper sealing member is used, and the sleeve 40 (corresponding to the sleeve 31) at the upper end of the core is plugged, as by a flanged disc 41 pressed in the lower end of sleeve 40. Accordingly, the lower sleeve and the sealing ring 42 carried thereby are inserted in a flanged bushing 23 on the lower end of the core 17, with the upper face of sealing ring 42 in direct fluid-tight engagement with the seamless rim of the bag aperture 26a at the bottom of the bag 18.

After the center of the bag has been assembled on the core 17 as above described, the two ends of the bag are rolled on or wrapped around the center core 17 with two lengths of corrugated wire screen mats 43, 44 interposed between adjacent convolutions of the bag, so as to separate said convolutions exteriorly of the bag when the latter is rolled around the core, thus providing fully unrestricted interior and exterior bag areas for filtering.

Figure 3:
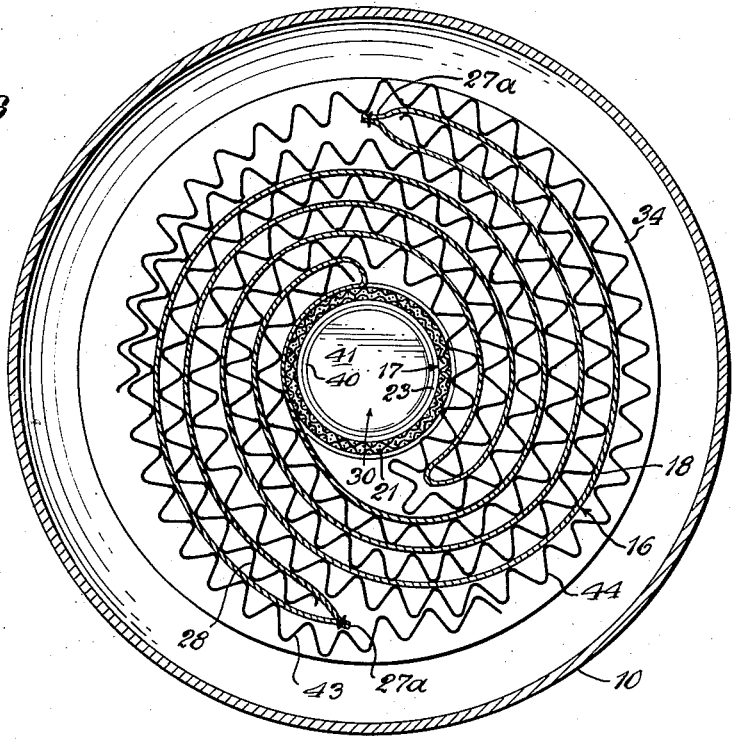
Figure 3 is a transverse section of the filter of Figure 1 but showing the filter element in tightly coiled position before fluid pressure is imposed on the said element.
Figure 4:
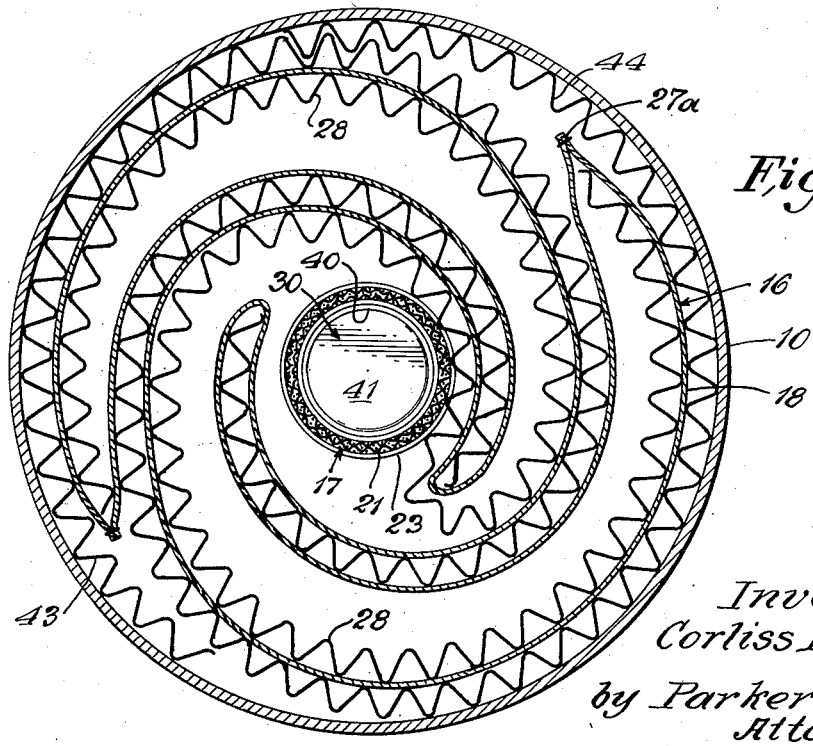
Figure 4 is a detail section taken on line 4—4 of Figure 1 showing the filter element in expanded position, as when it is under fluid pressure.

In the form shown in Figure 3, one of the last named separating mats 44 is longer than the other mat 43, so as to extend beyond the ends of the rolled-up bag and prevent the sides of the bag from engaging the interior of the shell when the bag is expanded under fluid pressure. It will be observed from Figure 3 that when the filter cartridge is initially placed in the casing 10, the bag and mats rolled up around the center tube are preferably of such lengths that they are loosely disposed with substantial spacing between adjacent convolutions and the side wall of the casing 10. The arrangement is such, however, that when the bag is placed under fluid pressure from within the center core 17, as shown in Figure 4, the bag will tend to expand and to a certain extent unwind into an increased overall diameter.

The use and operation is as follows:

When the cartridge 16 is inserted in the casing 10, the cover 11 is secured tightly to the top edge of the cylindrical casing 10. The assembled cartridge is of such length that the top surface of the upper sealing ring 33 will be retained under endwise pressure against the adjacent undersurface of the cover. This pressure also maintains the lower end of the bottom sealing member 30 against the bottom wall of the casing, thereby increasing the bag-sealing pressure of both sealing rings 33 and 42 of the upper and lower sealing members 29 and 30, respectively, at opposite ends of the core 17.

In practice, the filter cartridges are made long enough when installed in the shell to cause substantial endwise compression of at least one-eighth inch in the semi-elastic sealing rings 33 and 42 when the cover 11 is secured to the casing 10, thereby holding the entire cartridge assembly oil-tight in the casing, as well as imposing additional sealing compression on the rims of the apertures in the bag.

It will be noted that no piping or fittings need be disconnected or disturbed to remove or replace the filter cartridge. With a bag-type cartridge of such simple and economical construction, the entire cartridge can be thrown away and a new cartridge inserted in its place, if desired.

Various by-pass means may be provided, as usual, to relieve undue stress on the filter bag in the case of excess pressures, or if the bag clogs due to negligence of the operator. In the form of filter casing shown in Figures 1 to 5, inclusive, a by-pass relief valve 50 is mounted in the cover 11, as is common practice with many filters of the replaceable filter element type, so that further description of details of this by-pass valve construction need not be described herein.

In the modified form of filter unit shown in Figure 6, the by-pass relief valve is incorporated in and forms a part of the detachable filter unit. In this case the by-pass valve unit indicated generally at 45 includes a cylindrical metallic sleeve 46 fitted in and extending through an annular sealing ring 47 at the lower end of the core 17. This sealing ring 47 corresponds to the sealing ring 42 of Figure 1, and serves to retain the rim of the bag aperture in sealing engagement against the lower flanged bushing 23 on the core 17.

The relief valve consists of a ball 46a adapted to engage an annular ring seat 47a in the upper end of the cylindrical sleeve 46 when urged thereagainst by a coil spring 48 abutting a ring 49 supported at the lower end of the cylindrical sleeve. Said sleeve has apertures 50 and 51 near its bottom end for escape of fluid which may be by-passed through said relief valve. In other respects the use and operation of the form of cartridge shown in Figure 6 is the same as that previously described in connection with the form shown in Figures 1 to 5.

Although the assembled filter units are preferably designed for "inside out" filtering action wherein the fluid flows from the interior of the central core 17 and outwardly through the bag, it will be understood that the flow can be reversed for "outside in" filtering action.

Although I have shown and described certain embodiments of my invention, it will be understood that I do not wish to be limited to the exact construction shown and described but that various changes and modifications may be made without departing from the spirit and scope of the invention as defined by the appended claims.

I claim:

1. A filter cartridge for use in a pressure filter, comprising a filter member in the shape of an elongated fabric-covered bag having seamless areas at opposite edges thereof intermediate the ends of the bag, said areas having apertures therethrough, a perforated tube adapted to extend through the apertures in said bag, means connecting the opposite ends of said tube with said bag at said openings, each comprising a tubular sleeve mounted in close fitting engagement on said tube and having an abutment thereon and a reduced end portion adapted to extend through the adjacent aperture in said bag to hold the rim of the aperture against said tube with the abutment in close-fitting engagement against the adjacent edge of said bag, to seal said bag in fluid-tight relation to said tube and said sleeve, said bag being adapted to be wrapped around said tube.

2. The structure of claim 1, wherein one of said sleeves extends axially beyond the adjacent end of said bag and is adapted for detachable connection with a fluid conduit of a filter casing.

3. The structure of claim 2, wherein the end of the tube opposite the hollow sleeve is sealed to the bag by a non-perforated sleeve having a shouldered portion made of semi-elastic plastic material adapted to engage the adjacent aperture in the bag in sealing engagement with the end of the tube.

4. The structure of claim 1, wherein the rim of the bag aperture in one of said seamless edges is cut in circular form smaller than the end portion of the adjacent tubular sleeve, to provide seamless and wrinkle-free sealing engagement of the aperture rim between the sleeve abutment and the adjacent end of the tube.

5. The structure of claim 1, wherein each of the abutments on said sleeve consists of a sealing ring mounted thereon made of semi-elastic plastic material, adapted to impose increased sealing pressure between said bag and tube when the cartridge is mounted under endwise pressure in a filter casing with the sealing ring in seated engagement with the fluid conduit of the casing.

6. The structure of claim 5, wherein an annular plate is mounted on the lower sleeve in abutting relation to the under face of said sealing ring, and the under face of said plate is in abutting sealing relation with the adjacent area of the bag.

References Cited in the file of this patent

UNITED STATES PATENTS

| | | |
|---|---|---|
| 1,690,564 | Ward | Nov. 6, 1928 |
| 1,723,053 | McKinley | Aug. 6, 1929 |
| 1,951,484 | Lawes | Mar. 20, 1934 |
| 2,067,439 | Dooley | Jan. 12, 1937 |
| 2,255,937 | McNamara | Sept. 16, 1941 |
| 2,556,521 | Chase | June 12, 1951 |

FOREIGN PATENTS

| | | |
|---|---|---|
| 109,892 | Australia | Feb. 21, 1940 |
| 678,934 | Great Britain | Sept. 10, 1952 |